United States Patent
Weir, III

(10) Patent No.: US 8,684,460 B2
(45) Date of Patent: Apr. 1, 2014

(54) BACKREST STRUCTURE FOR A SEAT WITH LUMBAR SUPPORT AND CURVING ELEMENT COMPRISING A PRE-TENSIONING CONNECTING ELEMENT

(75) Inventor: Raymond Weir, III, Auburn Hills, MI (US)

(73) Assignee: Brose Fahrzeugteile GmbH & Co. KG, Coburg, Coburg (DE)

(*) Notice: Subject to any disclaimer, the term of this patent is extended or adjusted under 35 U.S.C. 154(b) by 281 days.

(21) Appl. No.: 13/161,225

(22) Filed: Jun. 15, 2011

(65) Prior Publication Data

US 2012/0319443 A1 Dec. 20, 2012

(51) Int. Cl.
A47C 7/46 (2006.01)

(52) U.S. Cl.
USPC .......................................... 297/284.4

(58) Field of Classification Search
USPC ............................... 297/284.4, 284.2
See application file for complete search history.

(56) References Cited

U.S. PATENT DOCUMENTS

| | | |
|---|---|---|
| 4,313,637 A | 2/1982 | Barley |
| 4,354,709 A | 10/1982 | Schuster |
| 4,452,485 A | 6/1984 | Schuster |
| 4,541,670 A | 9/1985 | Morgenstern et al. |
| 4,632,454 A | 12/1986 | Naert |
| 5,050,930 A | 9/1991 | Schuster et al. |
| 5,078,449 A | 1/1992 | Suzuki |
| 5,217,278 A | 6/1993 | Harrison et al. |
| 5,385,531 A | 1/1995 | Jover |
| 5,449,219 A | 9/1995 | Hay et al. |
| 5,685,606 A * | 11/1997 | Lance .................... 297/284.4 |
| 5,716,098 A | 2/1998 | Lance |
| 5,718,476 A | 2/1998 | De Pascal et al. |
| 5,769,490 A | 6/1998 | Falzon |
| 5,913,569 A | 6/1999 | Klingler |
| 5,954,399 A | 9/1999 | Hong |
| 6,254,186 B1 * | 7/2001 | Falzon .................... 297/284.1 |
| 6,338,530 B1 | 1/2002 | Gowing |
| 6,412,874 B1 | 7/2002 | Mayer |
| 6,536,840 B1 | 3/2003 | Schuster, Sr. et al. |

(Continued)

FOREIGN PATENT DOCUMENTS

DE 199 24 591 A1 11/2000
DE 201 00 018 U1 3/2002

(Continued)

*Primary Examiner* — David R Dunn
*Assistant Examiner* — Alexander Harrison
(74) *Attorney, Agent, or Firm* — Christie, Parker & Hale, LLP

(57) ABSTRACT

A backrest structure for a seat comprising a backrest frame which has a support structure and a front side facing the back of a seat user, a backrest cushion at the backrest frame a lumbar support mounted on the front side of the backrest frame for supporting the back of a seat user, an adjusting device for adjusting the position of the lumbar support perpendicular to the extension plane of the backrest frame and a curving element arranged on the front side of the backrest frame between the lumbar support and the backrest cushion. The curving element is secured to the support structure and the adjusting device acts on the curving element in order to adjust a curvature of the curving element. Furthermore, the backrest structure comprises at least one connecting element being connected to the curving element and the support structure, which connecting element applies a pre-tensioning force to the curving element in order to maintain the curving element in contact with the support structure.

20 Claims, 3 Drawing Sheets

(56) References Cited

U.S. PATENT DOCUMENTS

| | | |
|---|---|---|
| 6,616,227 B2 | 9/2003 | Blendea et al. |
| 6,676,214 B2 | 1/2004 | McMillen et al. |
| 6,682,144 B2 | 1/2004 | Klingler |
| 6,893,089 B2 | 5/2005 | McMillen et al. |
| 6,918,633 B2 | 7/2005 | Forkel et al. |
| 7,011,369 B2 | 3/2006 | Massara et al. |
| 7,201,446 B2 | 4/2007 | Massara et al. |
| 7,237,847 B2 | 7/2007 | Hancock et al. |
| 7,270,374 B2 | 9/2007 | Moriggi |
| 7,488,039 B2 | 2/2009 | Fischer et al. |
| 2001/0043002 A1* | 11/2001 | Nakane et al. ............. 297/284.1 |
| 2002/0113471 A1 | 8/2002 | Blendea et al. |
| 2002/0113472 A1 | 8/2002 | Blendea et al. |
| 2002/0140124 A1 | 10/2002 | Rutsch |
| 2003/0006635 A1 | 1/2003 | Klingler |
| 2003/0015901 A1 | 1/2003 | Och et al. |
| 2003/0071501 A1* | 4/2003 | Cruz Fernandes de Pinho et al. ........................... 297/284.4 |
| 2004/0075319 A1 | 4/2004 | VanSickle |
| 2005/0173957 A1 | 8/2005 | Schwarzbich et al. |
| 2007/0152483 A1* | 7/2007 | Fujita et al. ................ 297/284.1 |
| 2007/0228789 A1 | 10/2007 | McMillen |
| 2008/0164738 A1* | 7/2008 | Colja et al. ................. 297/284.4 |
| 2009/0008976 A1 | 1/2009 | Weinmueller |
| 2009/0212615 A1* | 8/2009 | Maierhofer et al. ....... 297/284.4 |
| 2010/0033002 A1* | 2/2010 | Di Giusto et al. .......... 297/284.2 |
| 2012/0013161 A1* | 1/2012 | Adams et al. .............. 297/284.2 |

FOREIGN PATENT DOCUMENTS

| | | |
|---|---|---|
| DE | 101 29 721 A1 | 1/2003 |
| DE | 101 45 206 A1 | 3/2003 |
| DE | 10 2005 004 758 A1 | 8/2006 |
| DE | 10 2008 020 436 A1 | 10/2009 |
| EP | 0 458 440 A1 | 11/1991 |
| EP | 0 808 746 A2 | 11/1997 |
| EP | 1 082 233 B1 | 3/2001 |
| JP | 58-170638 | 10/1983 |
| JP | 61-51059 | 4/1986 |
| JP | 3-120848 | 12/1991 |
| JP | 06-278511 | 10/1994 |
| JP | 2000-23779 | 1/2000 |
| JP | 2001-149177 | 6/2001 |
| WO | WO 03/031222 A1 | 4/2003 |

* cited by examiner

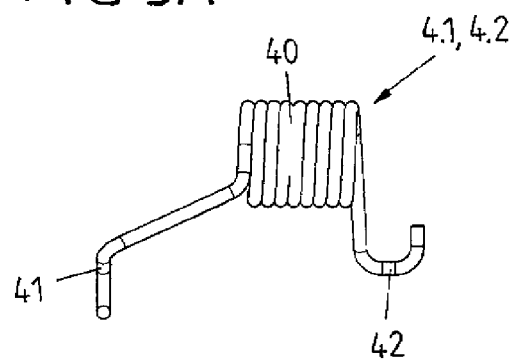
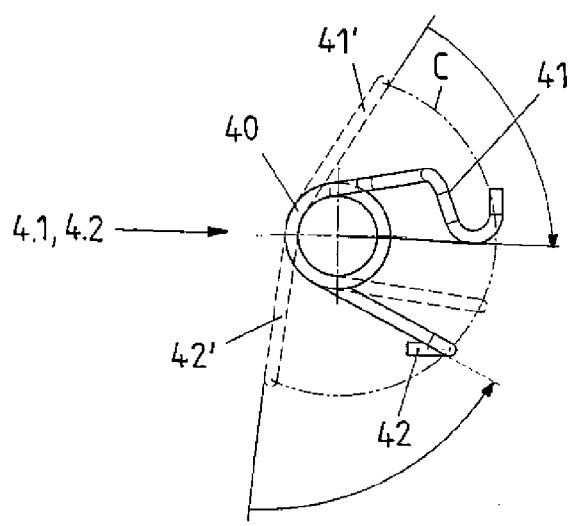
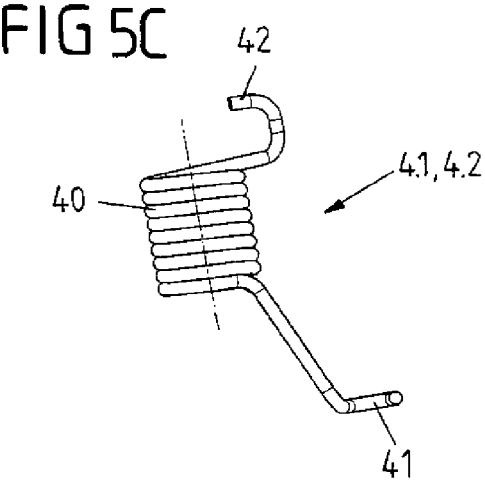

BACKREST STRUCTURE FOR A SEAT WITH LUMBAR SUPPORT AND CURVING ELEMENT COMPRISING A PRE-TENSIONING CONNECTING ELEMENT

BACKGROUND OF THE INVENTION

The invention relates to a backrest structure for a seat, in particular to a backrest structure for a motor vehicle seat, and to a backrest module for a backrest frame of a backrest structure.

A backrest structure of this kind comprises a backrest frame which has a support structure and a front side facing the back of a seat user. Along the front side of the backrest frame the spinal column of the seat user extends in a longitudinal direction of the seat back when the seat is in use. The backrest structure furthermore comprises a backrest cushion at the backrest frame, a lumbar support mounted on the front side of the backrest frame for supporting the back of a seat user and an adjusting device for adjusting the position of the lumbar support perpendicular to the extension plane of the backrest frame.

In order to adjust the curvature of the backrest cushion, which is mounted in front of the backrest frame, more comfortably for a seat user such a backrest structure additionally comprises a curving element e.g., in the form of a flexible or elastic mat. This curving element is arranged between the lumbar support and the backrest cushion and is secured to the support structure of the backrest frame. The adjusting device acts on the curving element in order to adjust a curvature of the curving element and thus a curvature of the backrest cushion. In this way, a curving element serves for a distribution of the pressure applied by the adjusting device.

The curving element in such a backrest structure is usually just clipped or plugged to the support structure of the backrest frame which furthermore is preferably designed in the form of a wire frame. The curving element may hence be easily mounted to the support structure of the backrest frame. Such is in particular advantageous since the adjusting device has normally to be assembled and fixed to the support structure prior to the mounting of the curving element so that the curving element—seen from the front side of a backrest facing a seat user—at least partially covers the assembled adjusting device.

Due to the simple connection of the curving element to a support structure of the backrest frame it is, however, often mandatory to provide a backrest structure with additional sound dampeners, e.g. felt pads, tape or wire flock, to avoid rattling noises when the seat backrest is in an unloaded state and not occupied by a seat user. The connection between the support structure and the curving element allows for a marginal relative movement of the curving element with respect to the support structure so that the curving element is not in contact with support structure and thus could audibly abut against or hit the support structure when the unloaded seat backrest is moved, for example during a ride in the case of a backrest of a motor vehicle seat.

One solution to this problem could be to increase the pre-load applied on the curving element via a backrest cushion. Such an approach is, however, not very effective and cannot reliably ensure that the curving element is maintained in a constant position at the support structure since the backrest cushion (or a foam inside the backrest cushion) may disadvantageously be deformed or compressed over the time of use.

It is thus an object of the present invention to improve a backrest structure of the type mentioned with regard to the minimization of rattling noises caused by a curving element of the backrest structure which is secured to a support structure of a backrest frame.

BRIEF DESCRIPTION

According to the invention a backrest structure is additionally provided with a connecting element which is connected to the curving element and the support structure and which applies a pre-tensioning force to the curving element in order to maintain the curving element in contact with the support structure. The at least one connecting element thus pushes or pulls the curving element towards the support structure so that the curving element, which is (already) secured to the support structure, is held in direct contact with the support structure even in an unloaded state of the seat backrest in which the respective seat is not occupied. Due to the connecting element the curving element thus reliably abuts on the supporting structure without the need of a pushing force applied by the backrest cushion and even without the backrest cushion contacting the curving element.

In an exemplary embodiment the connecting element interacting with both the curving element and the support structure has two ends of which one is fastened to the support structure and the other one is fastened to the curving element. These two ends of the connecting element are preferably displaceable with respect to each other, wherein the two ends are supported elastically or resiliently relative to a middle portion of the connecting element interlinking the two ends. In such an embodiment the two ends of the connecting element can be elastically pre-tensioned with respect to the middle portion so that each end has the tendency to return to an initial position when flexed relative to the middle section. In such a way the connecting element provides for a movability of the curving element with respect to the support structure of the backrest frame (e.g., due to a rotatably mounting of the curving element), when the curving element is already secured to the support structure. The connecting element thereby nevertheless ensures that the curving element remains in contact with the support structure and pushes the curving element and the support structure towards each other.

In one embodiment one end of the (elongated) connecting element engages a part of the support structure and the other end of the connecting element engages a part of the curving element, wherein the two parts are arranged offset with respect to each other. The connecting element is thus designed in such a way that the two ends of the connecting element are laterally spaced apart from each other along a direction running from a middle portion of the backrest frame towards a longitudinal side of the seat backrest when the backrest structure is mounted and assembled as intended in a seat backrest. This construction is in particular advantageous in terms of a configuration of the backrest structure as flat as possible.

In a preferred embodiment at least one end (or both ends) of the connecting element comprises a fastening portion via which the connecting element is linked with the support structure or the curving element in a positive-locking manner. Such could for example be achieved by a hook-shaped fastening portion engaging either the support structure or the curving element. Preferably, a fastening portion of the connecting element engages around a part of the support structure or the curving element in order to fix the connecting element to the respective component of the backrest structure.

In one embodiment the connecting element has a specific design in which each one of the two fastening portions of the connecting element substantially extends in an extension plane and the two extension planes are substantially perpendicular to each other. The two fastening portions thus for example engage around two parts either of the support structure or the curving element which parts extend in an angle of 90 degrees relative to each other.

In a preferred embodiment the connecting element comprises a torsion or spiral spring. In such a case the two fastening portions project from a wound middle portion.

In one embodiment there are two connecting elements which are respectively connected to the curving element and the support structure. Each of the connecting elements applies a pre-tensioning force to the curving element in order to maintain the curving element in contact with the support structure.

Preferably, in such an embodiment the two connecting elements are laterally spaced apart from each other. In this case the two connecting elements for example act at different (longitudinal) sides on the curving element. The two (longitudinal) sides of the curving element in this case for example may refer to edges of a substantially flat curving element which edges—in an assembled state of the backrest structure—are basically disposed in a vertical or horizontal orientation.

Although two connecting elements here may symmetrically act on the curving element and thus can ensure more effectively an abutment and direct contact of the curving element on the support structure, it may be nevertheless advantageous to equip a backrest structure according to the invention with just a single connecting element in order to minimize costs and time for the assembly procedure. Hence, it may be preferred to provide just a single connecting element in the case of a relatively small curving element. For example, such a single connecting element may be fastened to a curving element in the form of a flexible mat on a central or middle portion of the curving element so that the connecting element acts on the curving element near a substantially horizontal edge of the curving element with basically the same distance to longitudinal (vertical) sides of the curving element.

The curving element, which is preferably designed as a flexible or elastic mat, is advantageously secured to the support structure of the backrest frame via at least one-tongue-shaped or tab-shaped fastening portion by means of which the curving element may be clipped or plugged to the support structure. This also includes an embodiment in which the curving element is mounted to a wire frame of the support structure in a suspended manner.

According to another aspect of the present invention the support structure, the lumbar support and the curving element with the at least one connecting element form a pre-assembled backrest module to be mounted to a backrest frame. Thus, a backrest module to be mounted to a backrest frame is provided comprising a support structure to be fixed to the backrest frame, a lumbar support for supporting the back of a seat user arranged at the support structure, an adjusting device for adjusting the position of the lumbar support perpendicular to the extension plane of the backrest frame, and a curving element in the front of the lumbar support. The curving element is secured to the support structure. The adjusting device acts on the curving element in order to adjust a curvature of the curving element. Furthermore, at least one connecting element is connected to the curving element and the support structure which applies a pre-tensioning force to the curving element in order to maintain the curving element in contact with the support structure.

BRIEF DESCRIPTION OF THE DRAWINGS

Further features and advantages of the invention will now be explained in the following description of embodiments with reference to the drawings.

FIGS. 5A-5C show different views of a connecting element used in the backrest structure of FIGS. 1 to 4.

DETAILED DESCRIPTION

Figure 1:
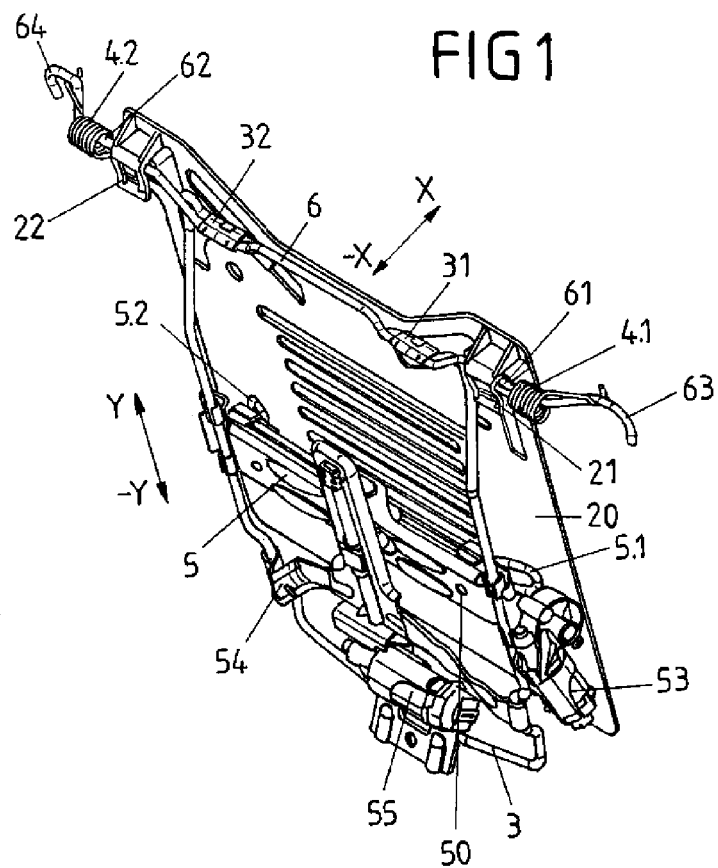
FIG. 1 is an isometric view of a backrest structure for a motor vehicle seat not showing a backrest cushion and the whole backrest frame.
Figure 2:
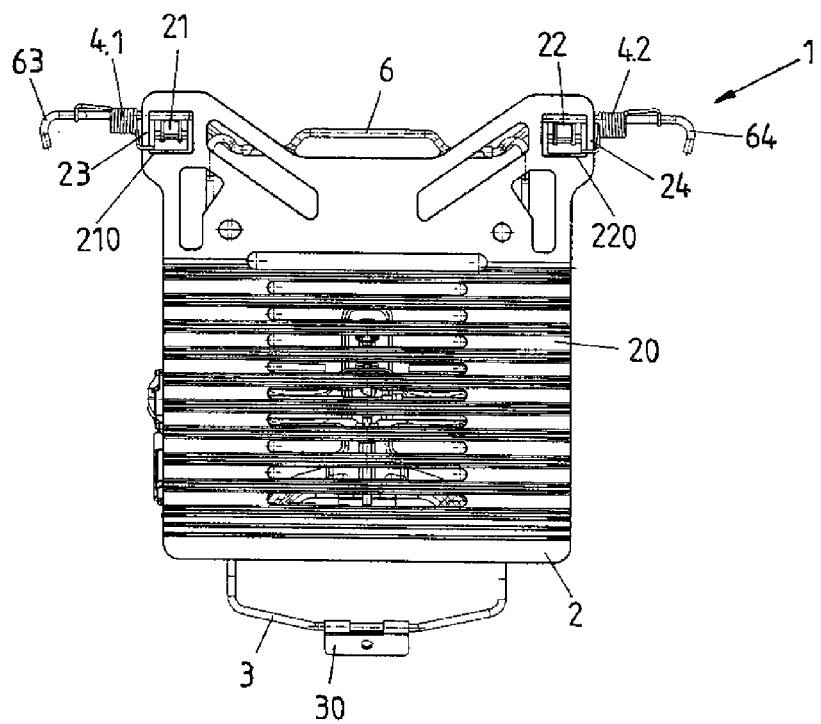
FIG. 2 is a front view of the backrest structure of FIG. 1.
Figure 4:
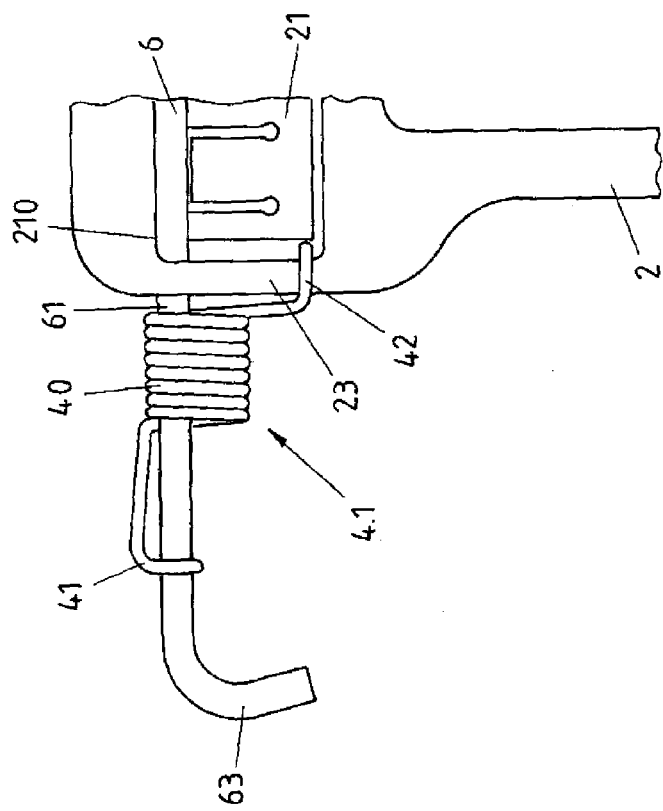
FIG. 4 is a front view showing details of a connecting element interlinking a support structure and a curving element of the backrest structure of FIGS. 1 to 3.
Figure 3:
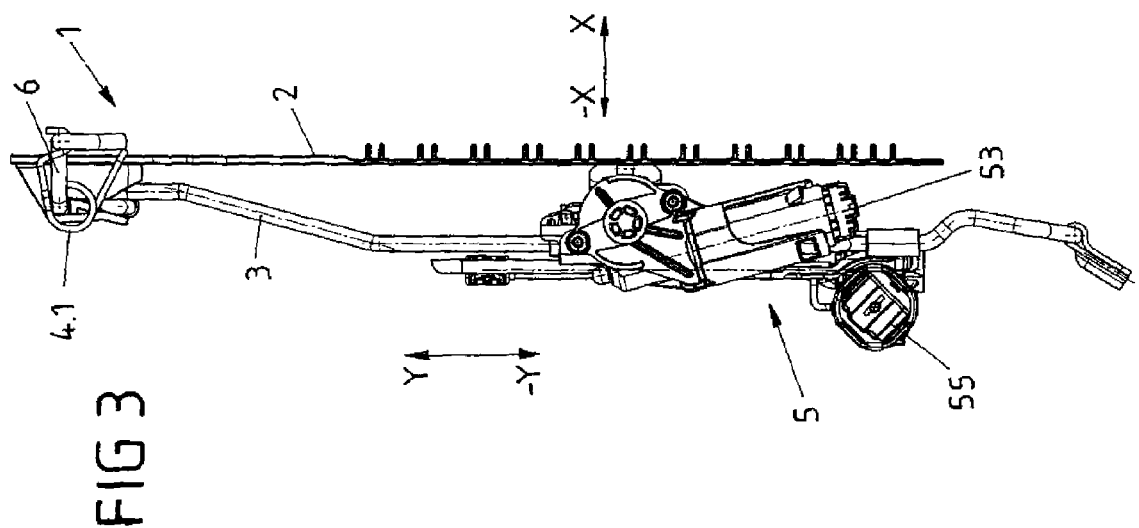
FIG. 3 shows a lateral view of the backrest structure of FIGS. 1 and 2.

An embodiment of a backrest structure for the backrest of a motor vehicle seat will now be explained with reference to FIGS. 1 to 4 as well as to FIGS. 5A to 5C. FIGS. 1 to 4 thereby show the backrest structure 1 in an assembled state in different views while FIGS. 5A to 5C show a connecting element 4.1, 4.2 of the backrest structure 1 in greater detail.

The backrest structure 1 comprises a backrest frame which has a front side facing the back of a seat user and extending along the spinal column of a seat user. The backrest frame is, however, not shown FIGS. 1 to 4, just a support structure 6 is apparent in the drawings. The support structure 6 has an elongated member which in an assembled state of the backrest structure 1 extends basically horizontally within the seat backrest and to which an adjustment device 5 of a lumbar support and a curving element 2 in the form of a flexible mat are fixed. The elongated member of the support structure 6 is a part of a wire frame and formed by a metal wire to be mounted within the backrest frame. In the present embodiment the support structure thus forms a part of a pre-assembled backrest module comprising the lumbar support with its adjustment device 5 and the curving element 2. This backrest module is to be mounted in the form of a functional unit to a backrest frame.

In another embodiment the support structure can evidently also formed integrally with a backrest frame so that the other components (e.g. an adjustment frame carrying a lumbar support and a curving element like a flexible mat) are to be mounted directly onto said support structure at the backrest frame.

The adjustment device 5 is arranged at an adjustment frame 3. The adjustment frame 3 carries the lumbar support with its adjusting device 5 for adjusting the position of the lumbar support perpendicular to the extension plane of the backrest frame (in a direction x or −x). The adjusting device 5 comprises a first carrier plate 50 on which two adjusting elements in the form of support yokes 5.1 and 5.2 are pivotably arranged in a known manner. The two support yokes 5.1, 5.2 are driven by a first (spindle) motor 53 fixed to the first carrier plate 50. Via the pivotable support yokes 5.1 and 5.2 the adjusting device 5 may act on the curving element 2 in order to adjust its curvature and thus the curvature of a backrest cushion (not shown) arranged in the front of the backrest frame and the curving element 2.

The first carrier plate 50 is furthermore slidably arranged at and coupled to a second carrier plate 54. A second (spindle) motor 55 is assigned to the second carrier plate 54. By means of the second motor 55 the first carrier plate 50 may be displaced along the second carrier plate 54 due to a driving force of the second motor 55. Due to the second motor 55 and the second carrier plate 54 the lumbar support thus may be adjusted parallel to the extension plane of the seat frame (in adjustment directions y and −y) and along a spinal column of a seat user whereas the first motor 53 and the first carrier plate 50 serve for an adjustment of the support yokes 5.1 and 5.2 and thus of the lumbar support perpendicular to the extension plane.

The first carrier plate 50 thereby slidably engages two parallel guiding rods of the adjustment frame 3 which are laterally spaced apart from each other and to which the second carrier plate 54 is immovably fixed.

The adjustment (wire) frame 3 in the present embodiment is also fixed to the support structure 6, here via two fixing sleeves 31 and 32. In this way, the adjusting device 5 may be pre-assembled with the adjustment frame 3 and afterwards fixed to the support structure 6.

In FIGS. 1 to 4 a securing part 30 is also shown by means of which the adjustment frame 3 may be immovably secured to the backrest frame at a second location which is spaced apart from the support structure 6 along a (vertical) longitudinal axis. The securing part 30 is hence arranged—in an assembled state of a seat backrest and with respect to the spinal column of a seat user—in a lower part of the backrest frame than the support structure 6. A pre-assembled backrest module according to the present embodiment is thus fixed to a backrest frame (twice at an upper lateral location and at a central lower location), at the one hand, by means of the support structure 6 including the adjustment frame 3 to which the adjusting device 5 is mounted and, on the other hand, by means of the securing part 30 at the adjustment frame 3.

The flexible mat (curving element 2) has a planar contact surface 20 at which a bottom side of a backrest cushion may rest and by means of which the mat may act on a backrest cushion. The mat, which—in a middle section of the flexible mat—is divided in several segments by elongated, transversally running apertures in order to provide for or improve the flexibility of the mat, is also fixed to the elongated member of the support structure 6. The securing of flexible mat to the support structure 6 is thereby achieved by two tongue-shaped (or tab-shaped) fastening portions 21 and 22 of the curving element 2. By means of these two tongue-shaped fastening portions the mat (curving element 2) may be clipped to the support structure 6 (or here, to be exactly, to the elongated member of the support structure 6), so that the mat is mounted to the support structure 6 in a suspended manner in front of the adjusting device 5. The mat thus covers the adjusting device 5 almost completely.

Each of the fastening portions 21 and 22 cooperates with an aperture 210, 220 respectively corresponding to one fastening portion 21 or 22 and by means of which the corresponding aperture 210 or 220 is covered, so that each fastening portion 21, 22 may engage the elongated member of the support structure 6 like a clip and arrests the curving element 2 at the support structure 6. Consequently, each fastening portion 21, 22 is preferably an integral portion of the mat (curving element 2) and bent in such a way that it projects over the corresponding aperture 210 or 220.

In order to maintain the curving element 2 in contact with the support structure 6 even when no load acts on the curving element 2 due to the weight of a seat user the embodiment of FIGS. 1 to 4 comprises two connecting elements 4.1 and 4.2 in the form of a spring element, in particular in the form of a torsion spring. The two connecting elements 4.1 and 4.2 respectively interlink the curving element 2 and the support structure 6. Further, each connecting element 4.1, 4.2 applies a pre-tensioning force to the curving element 2 in a direction towards the support structure 6 and away from a backrest cushion arranged in front of the curving element 2.

The two connecting elements 4.1 and 4.2 are arranged at or nearby different distal ends of the elongated member of the support structure 6 spaced apart from each other. Therefore, each connecting element 4.1, 4.2 is fixed to the support structure 6 at an attachment section 61 or 62 of the support structure 6, respectively. An attachment section 61, 62 extends between a fastening section 63 or 64 of the support structure 6 at which the support structure 6 is to be connected to the seat frame and a section of the support structure 6 at which the curving element 2 engages the support structure 6 by means of a clip-like fastening portion 21 or 22.

The connecting elements 4.1 and 4.2 each comprise a middle section 40 with several coils or windings from which two hook-shaped fastening portions 41 and 42 project at opposite sides of the middle section 40. One fastening portion 41 engages the support structure 6 in a positive-locking manner whereas the other fastening portion 42 engages a lug or link section 23, 24 of the curving element 2 in a positive locking manner. The two link sections 23 and 24 in each case form a boundary section or edge of a corresponding aperture 210 or 220 so that an engaging fastening portion 42 of a connecting element 4.1, 4.2 at least partly reaches into said aperture 210 or 220. Each one of the pair of connecting elements 4.1 and 4.2 is hence constructed and arranged in such a way that one end (at the fastening portion 41) of the connecting element 4.1, 4.2 engages a part of the support structure 6 and the other end (at the other fastening portion 42) of the connecting element 4.1, 4.2 engages a part of the curving element 2. Said two parts of the support structure 6 at the one hand and the curving element 2 at the other hand are arranged offset with respect to each other along a here basically horizontal direction running from a middle portion of the backrest frame towards a longitudinal side of the seat backrest when the backrest structure 1 is mounted as intended in the seat backrest.

The two fastening portions 41, 42 of a connecting element 4.1, 4.2, which may be easily plugged to both the support structure 6 and the curving element 2 due to their hook-shaped configuration, furthermore substantially extends in different extension planes which are perpendicular to each other. Both extension planes of the two fastening portions 41 and 42 are in addition perpendicular to the extension plane of the backrest frame and the extension plane of the contacting surface 20 of the curving element 2 in the unloaded state shown in FIGS. 1 to 4. In this way a connecting element 4.1, 4.2 may be arranged in a space-saving manner when engaging the support structure 6 as well as the curving element 2 while at the same time applying a pre-tensioning force to the curving element 2 so that it is maintained in direct contact with the support structure 6 and reliably abuts on the support structure 6.

In the present embodiment, the connecting elements 4.1 and 4.2 are respectively arranged with their wound middle portion 40 on the support structure 6. The middle portion 40 extends around and along the elongated (wire) member of the support structure 6. The middle portion 40 disposed on the support structure 6 thus appears to be wound around the elongated member and the elongated member of the support structure extends through the middle section 40. During assembly of the backrest structure 1 (and a respective backrest module) a connecting element 4.1, 4.2 is slid on the elongated member of the support structure 6 over one fastening portion 63 or 64 from one of the distal ends of the elongated member to a pre-determined (mounting) position. Afterwards, the hook-shaped fastening portions 41 and 42 of the connecting element 4.1 or 4.2. are connected to the support structure 6 and the curving element 2, respectively.

FIGS. 5A, 5B and 5C show different views of a single connecting element 4.1, 4.2 in the form of a torsion spring with the wound middle section 40 and the two fastening portions 41 and 42. The two ends of the connecting element 4.1, 4.2 formed by the fastening portions 41 and 42 are elastically pre-tensioned with respect to the middle portion 40 so that each end has the tendency to return to a given initial position when flexed (deflected) relative to the middle section 40. Such flexing is exemplary shown in FIG. 5B in which an outwardly flexed position of the fastening portions 41 and 42 is indicated in dotted lines with the reference numerals 41' and 42'. Due to the inherent resetting force of a connecting element 4.1, 4.2 the curving element 2 in the area of its fastening portions 21 and 22 is held in the desired position with respect to the support structure 6 in which the curving element 2 contacts the support structure 6. The connecting element 4.1, 4.2 thus prevents bumping of the curving element 2 against the support structure 6 and thus prevents or at least minimizes rattling noises due to such bumping.

Especially from FIG. 5C it is once again apparent that fastening portions 41 and 42 of a connecting element 4.1 and 4.2 project in different directions from the wound middle section 40 and that their U- or hook-shape ends extend in different extension planes with an angle of 90 degrees relative to each other. As can further be seen from the side view of FIG. 5B the two fastening portions 41 and 42 are bent with a length from the middle section 40 radially outwardly in such a way that the two fastening portions 41 and 42 in a side or cross sectional view of the connecting element 4.1, 4.2 appear to lie on a single imaginary circle C (although the two fastening portions 41, 40 differ in their length and size). As a consequence, the dimensions of a connecting element 4.1, 4.2 perpendicular to the longitudinal middle section 40 are solely defined by the two fastening portions 41 and 42. Furthermore, a connecting element 4.1, 4.2 in total is relatively small in size.

Since the curving element 2 during adjustment by the adjusting device 5 may be curved to a maximum convex curvature and the curving element 2 thereby is at least slightly pivoted with respect to the support structure 6, the connecting elements 4.1 and 4.2 are constructed and designed in such a way that they allow for such pivotal movement of the curving element 2. The fastening portion 42 engaging the curving element 2 thus may be displaced with respect to the other fastening portion 41 engaging the support structure 6 about an angle α around a pivot axis defined by the wound middle section 40. A connecting element 4.1, 4.2 in this case allows for a displacement of at least one fastening portion 41, 42 with respect to the other fastening portion 42, 41 against a resetting force inherent to the connecting element 4.1, 4.2, which displacement is caused during the adjustment of the lumbar support and the curving element 2.

In the embodiment of FIGS. 1 to 4 and 5A to 5C the connecting elements 4.1 and 4.2 are made of metal wire and the curving element 2 in the form of a flexible mat is made of plastic. However, it is apparent that the components of the back structure 1 may also be made of different materials provided that they fulfil the described functions and conditions.

The invention claimed is:
1. A backrest structure for a seat comprising:
a backrest frame which has a support structure and a front side facing a back of a seat user;
a backrest cushion at the backrest frame;
a lumbar support mounted on the front side of the backrest frame for supporting the back of a seat user;
an adjusting device for adjusting the position of the lumbar support perpendicular to the extension plane of the backrest frame; and
a curving element arranged on the front side of the backrest frame between the lumbar support and the backrest cushion, wherein the curving element is secured to the support structure and the adjusting device acts on the curving element in order to adjust a curvature of the curving element,
wherein the curving element is mounted to the support structure in front of the adjusting device and comprises at least one fastening section via which the curving element is secured to the supporting structure, and
wherein
at least one connecting element is connected to the curving element and the support structure, the at least one connecting element connecting the curving element to the support structure in addition to a connection via the fastening section and the at least one connecting element applying a pre-tensioning force to the curving element in a direction towards the support structure and away from the backrest cushion arranged in front of the curving element in order to maintain the curving element in such a contact with the support structure to minimize movement of the curving element against the support structure and the adjusting device.

2. The backrest structure according to claim 1, wherein the connecting element has two ends of which one is fastened to the support structure and another one is fastened to the curving element.

3. The backrest structure according to claim 2, wherein the two ends of the connecting element are displaceable with respect to each other.

4. The backrest structure according to claim 3, wherein the two ends of the connecting element are elastically pre-tensioned with respect to a middle portion of the connecting element so that each end has a tendency to return to an initial position when flexed relative to the middle section.

5. The backrest structure according to claim 2, wherein one end of the connecting element engages a part of the support structure and the other end of the connecting element engages a part of the curving element the two parts being arranged offset with respect to each other.

6. The backrest structure according to claim 5, wherein the lumbar support, the adjusting device and the curving element are in use all to be arranged between two longitudinal and substantially vertical sides of a seat backrest and the two parts being respectively engaged by one of the two ends of the connecting element are spaced apart from each other along a direction running from a middle portion of the backrest frame towards a longitudinal side of the seat backrest.

7. The backrest structure according to claim 2, wherein at least one end of the connecting element comprises a fastening portion via which the connecting element is linked with the support structure or the curving element in a positive-locking manner.

8. The backrest structure according to claim 7, wherein a fastening portion of the connecting element is hook-shaped.

9. The backrest structure according to claim 7, wherein both ends of the connecting element comprise a fastening portion via which the connecting element is linked with either the support structure or the curving element in a positive-locking manner.

10. The backrest structure according to claim 7, wherein each one of the two fastening portions of the connecting element substantially extends in an extension plane and the two extension planes are substantially perpendicular to each other.

11. The backrest structure according to claim 10, wherein each fastening portion of the connecting element is hook-shaped and the hook-shaped fastening portions extend in different extension planes which are substantially perpendicular to each other.

12. The backrest structure according to claim 1, wherein the connecting element comprises a torsion or spiral spring.

13. The backrest structure according to claim 1, wherein two connecting elements are connected to the curving element and the support structure which each apply a pre-tensioning force to the curving element in order to maintain the curving element in contact with the support structure.

14. The backrest structure according to claim 13, wherein the two connecting elements are laterally spaced apart from each other.

15. The backrest structure according to claim 1, wherein the connecting element is connected to the curving element in the area of the fastening section.

16. The backrest structure according to claim 1, wherein the curving element is clipped to the supporting structure via the fastening section.

17. The backrest structure according to claim 1, wherein the fastening section comprises a substantially tongue-shaped portion via which the curving element is secured to the support structure.

18. The backrest structure according to claim 1, wherein the support structure, the lumbar support and the curving element with the at least one connecting element form a pre-assembled backrest module to be mounted to the backrest frame.

19. A backrest module to be mounted to a backrest frame comprising:
   a support structure to be fixed to the backrest frame the support structure including a wire frame;
   a lumbar support for supporting the back of a seat user arranged at the wire frame of the support structure;
   an adjusting device for adjusting the position of the lumbar support perpendicular to the extension plane of the backrest frame, the adjusting device being mounted to the wire frame; and
   a curving element in the front of the lumbar support, wherein the curving element is secured to the wire frame of the support structure and the adjusting device acts on the curving element in order to adjust a curvature of the curving element,
   wherein the curving element is mounted to the wire frame in front of the adjusting drive, and
wherein
at least one connecting element is connected to the curving element and the wire frame of the support structure, the at least one connecting element applying a pre-tensioning force to the curving element in a direction towards the wire frame and away from a backrest cushion arranged in front of the curving element.

20. A backrest structure for a seat comprising:
   a backrest frame which has a support structure and a front side facing a back of a seat user;
   a backrest cushion at the backrest frame;
   a lumbar support mounted on the front side of the backrest frame for supporting the back of a seat user;
   an adjusting device for adjusting a position of the lumbar support perpendicular to an extension plane of the backrest frame; and
   a curving element arranged on the front side of the backrest frame between the lumbar support and the backrest cushion, wherein the curving element is secured to the support structure and the adjusting device acts on the curving element in order to adjust a curvature of the curving element,
wherein the adjusting device comprises at least one adjusting element which is pivotably arranged and via which the adjusting device acts on the curving element in order to adjust a curvature of the curving element and wherein the curving element is mounted to the support structure in front of the adjusting device,
   wherein at least one connecting element is connected to the curving element and the support structure, the at least one connecting element applying a pre-tensioning force to the curving element in a direction towards the support structure and away from the backrest cushion arranged in front of the curving element, and
   wherein the connecting element has two ends of which one is fastened to the support structure and another one is fastened to the curving element, the two ends of the connecting element being displaceable with respect to each other.

* * * * *